(12) United States Patent
Wallner

(10) Patent No.: US 6,250,667 B1
(45) Date of Patent: Jun. 26, 2001

(54) INFLATABLE SIDE CURTAIN

(75) Inventor: John P. Wallner, Rochester Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/476,523

(22) Filed: Jan. 3, 2000

(51) Int. Cl.$^7$ ................................................ B60R 21/22
(52) U.S. Cl. ................ 280/730.2; 280/729; 280/743.1; 280/749
(58) Field of Search ................ 280/730.2, 743.2, 280/743.1, 729, 730.1, 749, 751, 753

(56) References Cited

U.S. PATENT DOCUMENTS

| | | | |
|---|---|---|---|
| 3,953,049 | * | 4/1976 | Surace et al. .................. 280/749 |
| 5,524,924 | * | 6/1996 | Steffens, Jr. et al. ............ 280/730.2 |
| 5,788,270 | | 8/1998 | Haland et al. . |
| 5,833,265 | * | 11/1998 | Seymour ..................... 280/743.1 |
| 5,865,462 | | 2/1999 | Robins et al. . |
| 5,884,937 | | 3/1999 | Yamada . |
| 5,899,491 | | 5/1999 | Tschaeschke . |

FOREIGN PATENT DOCUMENTS

| | | |
|---|---|---|
| 19743626 | 4/1998 | (DE) . |
| 96/26087 | 8/1996 | (WO) . |
| 98/07598 | 2/1998 | (WO) . |

* cited by examiner

Primary Examiner—Eric Culbreth
(74) Attorney, Agent, or Firm—Tarolli, Sundheim, Covell, Tummino & Szabo L.L.P.

(57) ABSTRACT

Apparatus (10) for helping to protect an occupant of a vehicle (12) which has a side structure (16) and a roof (18) comprises an inflatable vehicle occupant protection device (14). The inflatable vehicle occupant protection device (14) is inflatable away from the vehicle roof (18) into a position between the side structure (16) of the vehicle (12) and a vehicle occupant. An inflation fluid source (24) provides inflation fluid for inflating the inflatable vehicle occupant protection device (14). A plurality of arc-shaped connections (60) define a plurality of arc-shaped chambers (70) of the inflatable vehicle occupant protection device. Each of the arc-shaped chambers (70) includes an arc-shaped upper side wall defined by one of the arc-shaped connections (60) and an arc-shaped lower side wall defined by another of the arc-shaped connections. The arc-shaped chambers (70) are positioned vertically adjacent to each other such that the lower side wall of one of the arc-shaped chambers forms the upper side wall of an adjacent arc-shaped chamber.

18 Claims, 2 Drawing Sheets

US 6,250,667 B1

INFLATABLE SIDE CURTAIN

FIELD OF THE INVENTION

The present invention relates to an inflatable vehicle apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The inflatable vehicle occupant protection device includes a plurality of arc-shaped connections that define a plurality of arc-shaped chambers of the inflatable vehicle occupant protection device. Each of the arc-shaped chambers includes an arc-shaped upper side wall defined by one of the arc-shaped connections and an arc-shaped lower side wall defined by another of the arc-shaped connections. The arc-shaped chambers are positioned vertically adjacent to each other such that the lower side wall of one of the arc-shaped chambers forms the upper side wall of an adjacent arc-shaped chamber.

The present invention also relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The inflatable vehicle occupant protection device includes a plurality of concentric arc-shaped connections that define a plurality of concentric arc-shaped chambers of the inflatable vehicle occupant protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF PREFERRED EMBODIMENTS

Figure 1:
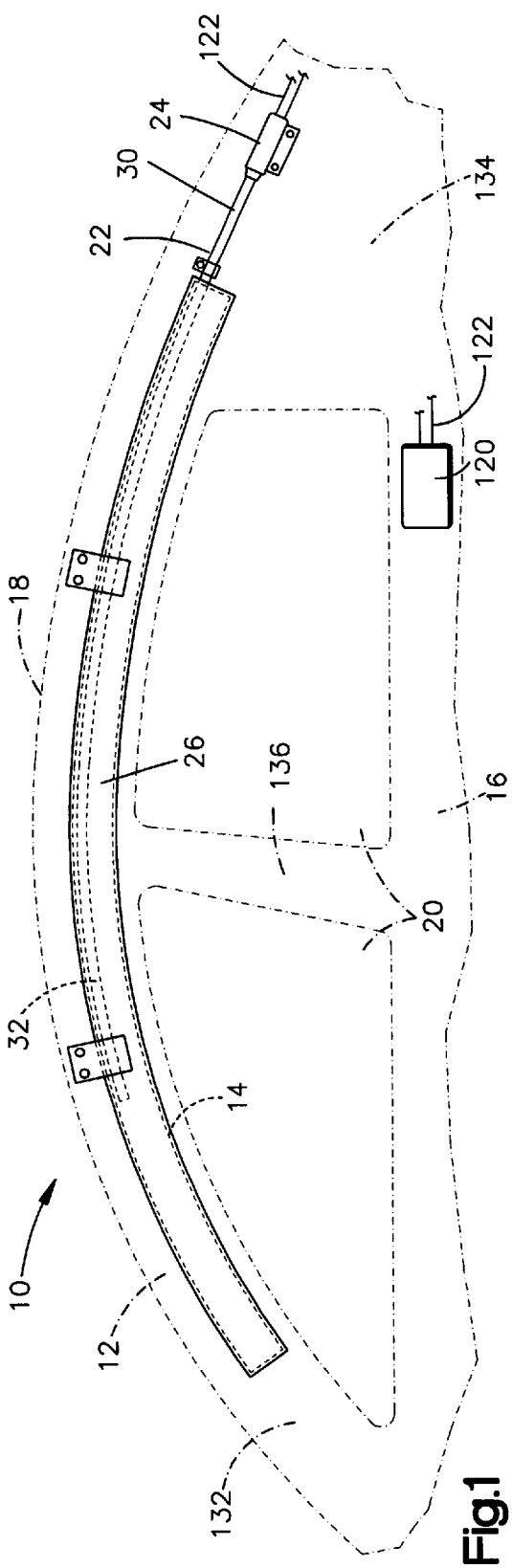
FIG. 1 is a schematic view of an apparatus for helping to protect an occupant of a vehicle, according to the present invention illustrating the apparatus in a deflated condition.
Figure 2:
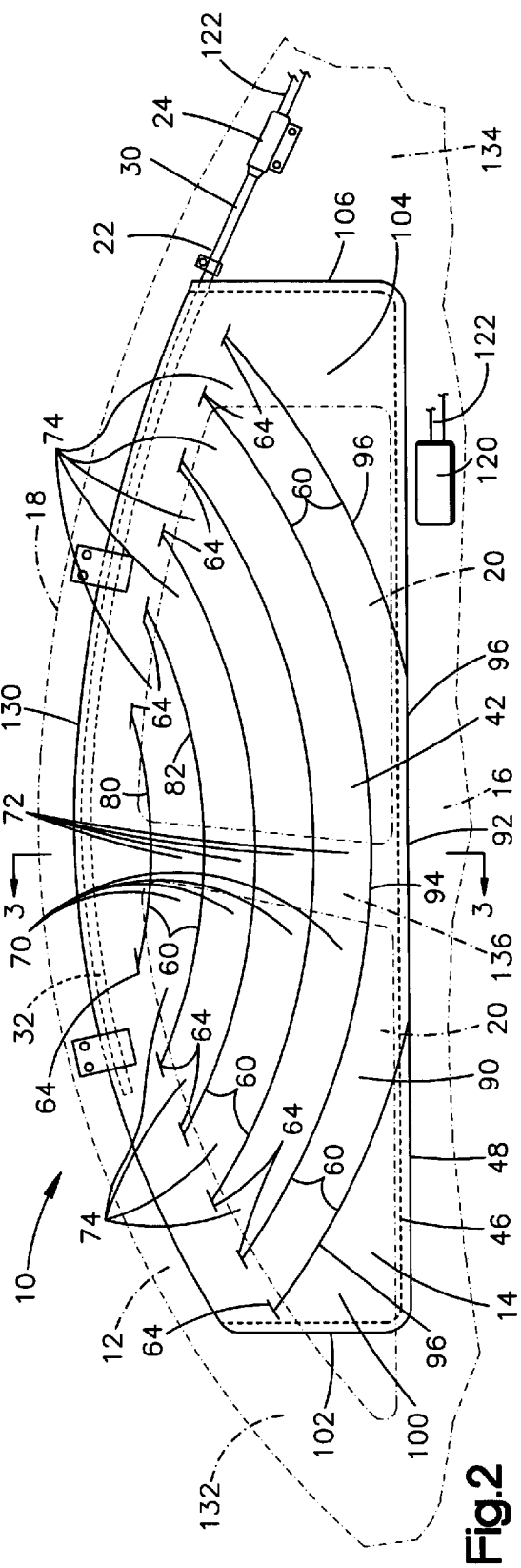
FIG. 2 is a schematic view of the apparatus of FIG. 1 in an inflated condition.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 22 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

Figure 3:
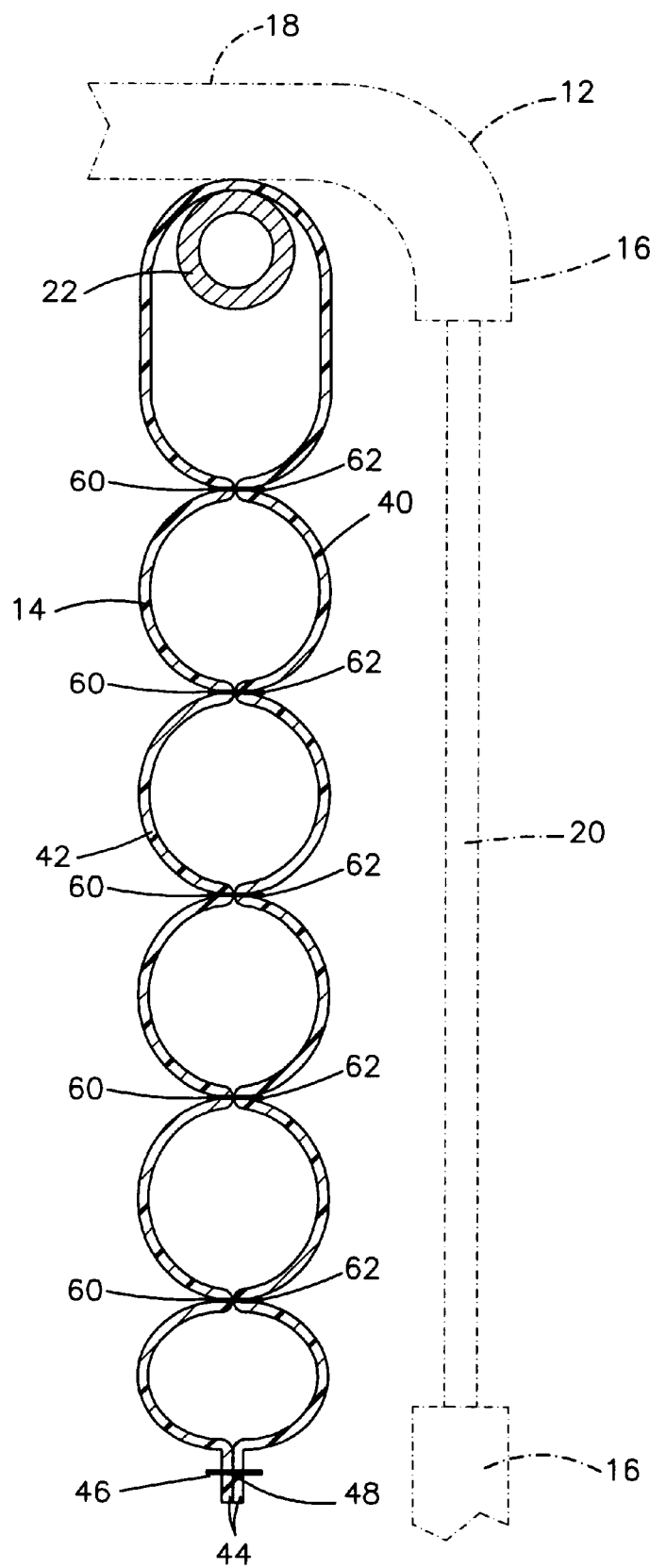
FIG. 3 is a sectional view of the apparatus of FIG. 2 taken generally along line 3—3 in FIG. 2.

As best illustrated in FIG. 3, the inflatable curtain 14 comprises first and second panels 40 and 42 that are arranged in an overlying manner. Overlapping portions 44 (FIG. 3) of the first and second panels 40 and 42 are secured together by stitching 46 (FIGS. 2 and 3) that extends along the periphery 48 of the panels.

In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire periphery 48 of the panels to form the inflatable curtain 14. The first and second panels 40 and 42 may also be woven together around their perimeters to form the inflatable curtain 14.

The first and second panels 40 and 42 are constructed of a fabric, such as nylon, that is coated with a gas impermeable material, such as urethane or silicone. The inflatable curtain 14 thus may have a substantially air-tight construction. Other materials, such as elastomers, plastic films, or combinations thereof may also be used to construct the inflatable curtain 14. The first and second panels 40 and 42 may also be formed of single or multi-layered sheets of material.

The first and second panels 40 and 42 are connected together at a plurality of arc-shaped connections 60 by known means 62, such as stitching or weaving. As shown in the illustrated embodiment, the arc-shaped connections 60 may be concentric. The arc-shaped connections 60 may include reinforcing segments 64 (FIG. 2) at the ends of the arc-shaped connections. Alternative means (not shown) such as dielectric sealing, ultrasonic bonding, heat sealing, and adhesives may also be used to form the arc-shaped connections 60. The first and second panels 40 and 42 may also be connected together at the arc-shaped connections 60 by tethers that correspond to the shape and pattern of the connections and are sewn or otherwise secured to the panels 40 and 42 to interconnect the panels.

The arc-shaped connections 60 define a plurality of arc-shaped chambers 70 that are in fluid communication with each other. As shown in the illustrated embodiment, the arc-shaped chambers 70 may be concentric. Each of the arc-shaped chambers 70 includes a central portion 72 and opposite end portions 74. The end portions 74 of each of the arc-shaped chambers 70 terminate at a position vertically above the central portion 72 when the inflatable curtain 14 is in the inflated position of FIG. 2.

Each of the arc-shaped chambers 70, when inflated, includes an upper side wall and a lower side wall. The arc-shaped chambers 70 are arranged in a nested configuration and positioned vertically adjacent to each other. As a result, the upper side wall of some of the arc-shaped chambers 70 forms the lower side wall of an adjacent arc-shaped chamber. For example, the uppermost chamber 70, when inflated, has an upper side wall 80 and a lower side wall 82. The lower side wall 82 of the uppermost chamber 70 is the upper side wall of the chamber 70 immediately adjacent to the uppermost chamber.

The inflatable curtain 14 also includes inflatable chambers 90, 100, and 104 that are at least partially defined by edge portions of the curtain. The chamber 90 has a central portion that is positioned adjacent to a lower edge 92 of the inflatable curtain 14. The chamber 90 has an arc-shaped upper side wall 94 defined by one of the arc-shaped connections 60. A lower side wall 96 of the lower chamber 90 is defined by the stitching 46 adjacent the lower edge 92 of the inflatable curtain 14 and by arc-shaped connections 60 that intersect the stitching 46. The front chamber 100 is defined by the stitching 46 adjacent a front edge 102 of the inflatable curtain 14, the stitching 46 adjacent the lower edge 92 of the curtain, and an arc-shaped connection 60. A rear chamber 104 is defined by the stitching 46 adjacent a rear edge 106 of the inflatable curtain 14, the stitching 46 adjacent the lower edge 92 of the curtain, and an arc-shaped connection 60.

The vehicle 12 includes a sensor mechanism 120 (shown schematically in FIGS. 1 and 2) for sensing a side impact to the vehicle 12 and/or a rollover of the vehicle 12. The sensor mechanism 120 actuates the inflator 24 in response to the sensing of a side impact or a vehicle rollover.

In the event of a rollover of the vehicle 12 or a side impact to the vehicle of a magnitude greater than a predetermined threshold value, the sensor mechanism 120 provides an electrical signal over lead wires 122 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. A top edge 130 of the inflatable curtain 14 is positioned adjacent to the intersection of the roof 18 and the side structure 16 of the vehicle 12. The front edge 102 of the inflatable curtain 14 is positioned adjacent to an A pillar 132 of the vehicle 12. The rear edge 106 of the inflatable curtain 14 is positioned adjacent to a C pillar 134 of the vehicle 12. The inflatable curtain 14 extends between the A pillar 132 and the C pillar 134 of the vehicle 12 and overlies at least a portion of the A pillar, C pillar, and a B pillar 136 of the vehicle.

It will be recognized by those skilled in the art that the inflatable curtain may have alternative configurations. For example, in the illustrated embodiment, the inflatable curtain 14 extends between the A pillar 132 and the C pillar 134 of the vehicle 12. The inflatable curtain 14 could, however, extend between the A pillar 132 and the B pillar 136 only or between the B pillar and the C pillar 134 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. The arc-shaped connections 60 help to limit the thickness of the inflated inflatable curtain 14 and help to reduce the overall volume of the curtain. The reinforcing segments 64 help to prevent the panels 40 and 42 from becoming separated at the ends of the arc-shaped connections 60 upon inflation of the curtain or during impacts with the curtain. The arc-shaped chambers 70, when inflated, help to absorb the energy of impacts with the inflatable curtain 14 and help to distribute the impact energy over a large area of the curtain.

From the above description of the invention, those skilled in the art will perceive improvements, changes and modifications. For example, the arc-shaped connections 60 may vary in number from the illustrated embodiment. Also, in the illustrated embodiment, the inflatable curtain 14 includes a single group of nested arc-shaped chambers 70. However, the number of groups of nested arc-shaped chambers 70 could vary. For example, the inflatable curtain 14 may include two or more groups that are spaced horizontally apart when the inflatable curtain 14 is inflated. Such improvements, changes and modifications within the skill of the art are intended to be covered by the appended claims.

Having described the invention, the following is claimed:

1. Apparatus for helping to protect an occupant of a vehicle, said apparatus comprising:

an inflatable vehicle occupant protection device that is adapted to inflate away from a roof of the vehicle into a position between a side structure of the vehicle and a vehicle occupant; and an inflation fluid source that provides inflation fluid for inflating said inflatable vehicle occupant protection device;

said inflatable vehicle occupant protection device comprising a plurality of arc-shaped connections that define a plurality of arc-shaped chambers of the inflatable vehicle occupant protection device, each of said arc-shaped chambers comprising an arc-shaped upper side wall defined by one of said arc-shaped connections and an arc-shaped lower side wall defined by another of said arc-shaped connections;

each of said arc-shaped chambers including a central portion and opposite terminal end portions, said central portion and said terminal end portions being adapted to inflate into a position adjacent the vehicle side structure between the side structure and the vehicle occupant, said arc-shaped chambers being positioned vertically adjacent to each other such that the lower side wall of one of said arc-shaped chambers forms the upper side wall of an adjacent arc-shaped chamber.

2. Apparatus as defined in claim 1, wherein said inflatable vehicle occupant protection device further comprises a pair of overlying panels, said arc-shaped connections comprising arc-shaped seams securing said panels together.

3. Apparatus as defined in claim 1, wherein said terminal end portions of each of said arc-shaped chambers being positioned vertically above the respective central portion of said each of said arc-shaped chambers when said inflatable vehicle occupant protection device is inflated.

4. Apparatus as defined in claim 1, wherein said plurality of arc-shaped connections are concentric.

5. Apparatus as defined in claim 1, wherein said plurality of arc-shaped chambers are concentric.

6. Apparatus as defined in claim 1, wherein said arc-shaped chambers are in fluid communication with each other.

7. Apparatus as defined in claim 1, wherein said inflatable vehicle occupant protection device is an inflatable curtain having a stored position in which said inflatable curtain is adapted to extend along the side structure adjacent to a roof of the vehicle, said inflatable curtain being adapted to inflate away from the vehicle roof into said position between the side structure of the vehicle and a vehicle occupant.

8. Apparatus as defined in claim 7, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

9. Apparatus as defined in claim 7, wherein said inflatable curtain when inflated extends along the side structure of the vehicle between an A pillar and a C pillar of the vehicle.

10. Apparatus as defined in claim 7, wherein said inflatable curtain, when inflated, is adapted to overlie at least a portion of an A pillar, a B pillar and a C pillar of the vehicle.

11. Apparatus as defined in claim 1, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

12. Apparatus as defined in claim 1, wherein said inflation fluid source comprises an inflator which is actuatable to inflate said inflatable vehicle occupant protection device.

13. Apparatus for helping to protect an occupant of a vehicle, said apparatus comprising:
   an inflatable vehicle occupant protection device that is adapted to inflate away from a roof of the vehicle into a position between a side structure of the vehicle and a vehicle occupant; and
   an inflation fluid source that provides inflation fluid for inflating said inflatable vehicle occupant protection device;
   said inflatable vehicle occupant protection device comprising a plurality of concentric arc-shaped connections that define a plurality of concentric arc-shaped chambers of the inflatable vehicle occupant protection device, each of said arc-shaped chambers including a central portion and opposite terminal end portions, said central portion and said terminal end portions, when inflated, being adapted to be positioned adjacent the vehicle side structure between the side structure and the vehicle occupant.

14. Apparatus as defined in claim 13, wherein each of said arc-shaped chambers comprises an arc-shaped upper side wall defined by one of said arc-shaped connections and an arc-shaped lower side wall defined by another of said arc-shaped connections.

15. Apparatus as defined in claim 13, wherein said arc-shaped chambers are positioned vertically adjacent to each other such that the lower side wall of one of said arc-shaped chambers forms the upper side wall of an adjacent arc-shaped chamber.

16. Apparatus as defined in claim 13, wherein said inflatable vehicle occupant protection device further comprises a pair of overlying panels, said arc-shaped connections comprising arc-shaped seams securing said panels together.

17. Apparatus as defined in claim 13, wherein said terminal end portions of each of said arc-shaped chambers being positioned vertically above the respective central portion of said each of said arc-shaped chambers when said inflatable vehicle occupant protection device is inflated.

18. Apparatus as defined in claim 13, wherein said arc-shaped chambers are in fluid communication with each other.

* * * * *